(12) United States Patent
Yui (10) Patent No.: US 8,153,074 B2
(45) Date of Patent: Apr. 10, 2012

(54) OZONE STERILIZING SYSTEM FOR WATER DISPENSING SYSTEM

(76) Inventor: George Yui, Brampton (CA)

( * ) Notice: Subject to any disclaimer, the term of this patent is extended or adjusted under 35 U.S.C. 154(b) by 1120 days.

(21) Appl. No.: 11/659,869

(22) PCT Filed: Aug. 10, 2005

(86) PCT No.: PCT/CA2005/001226
§ 371 (c)(1),
(2), (4) Date: Oct. 19, 2007

(87) PCT Pub. No.: WO2006/015480
PCT Pub. Date: Feb. 16, 2006

(65) Prior Publication Data
US 2008/0050290 A1   Feb. 28, 2008

(30) Foreign Application Priority Data

Aug. 10, 2004 (CN) .................. 2004 2 0081792 U
Aug. 10, 2004 (CN) .................. 2004 2 0081793 U (51) Int. Cl.
*B01J 19/08* (2006.01)
(52) U.S. Cl. ................................. 422/186.12
(58) Field of Classification Search ............ 422/186.07, 422/186.12
See application file for complete search history.

(56) References Cited

U.S. PATENT DOCUMENTS

| | | | | |
|---|---|---|---|---|
| 4,019,986 A | * | 4/1977 | Burris et al. | ........... 210/139 |
| 5,683,576 A | * | 11/1997 | Olsen | ........... 210/138 |
| 6,017,447 A | * | 1/2000 | Wright et al. | ........... 210/192 |
| 6,532,760 B2 | | 3/2003 | Davis | |
| 7,132,007 B1 | * | 11/2006 | von Blucher et al. | ........... 95/90 |
| 2003/0071069 A1 | * | 4/2003 | Shelton | ........... 222/190 |

FOREIGN PATENT DOCUMENTS

| | | |
|---|---|---|
| CA | 2079578 | 9/1992 |
| CA | 2191493 | 11/1996 |
| CA | 2346958 | 4/2000 |

OTHER PUBLICATIONS

International Search Report for PCT/CA2005/001226, mailed Dec. 20, 2005, 2 pages.

* cited by examiner

*Primary Examiner* — Kishor Mayekar
(74) *Attorney, Agent, or Firm* — Wolf, Greenfield & Sacks, P.C.

(57) ABSTRACT

An ozone generating system includes a water reservoir for accepting water from a water source, such as an inverted water bottle or a point of use water source. Once delivered to the reservoir, water therein may be dispensed for human consumption. An ozone generator produces ozone and such ozone is delivered to water within the reservoir through an ozone diffuser connected to the ozone generator and positioned within the water reservoir at a central bottom location. The water reservoir includes a cover which is sealed closed to prevent release of generated ozone into the atmosphere. Filter means, such as an active carbon filter, is provided which captures and neutralizes excess ozone within the reservoir. Preferably, the ozone generator is mounted inside of the dispenser, either above the water reservoir or below the water tank, inside of the cooler cabinet.

9 Claims, 11 Drawing Sheets

OZONE STERILIZING SYSTEM FOR WATER DISPENSING SYSTEM

RELATED CASE INFORMATION

This application is a US National Stage Application of International Application No. PCT/CA2005/001226 filed on Aug. 10, 2005, claiming priority to Chinese Application No. 200420081793.6 filed on Aug. 10, 2004 and Chinese Application No. 200420081792.1 filed on Aug. 10, 2004, the entire disclosures of which are incorporated herein by reference.

FIELD OF THE INVENTION

This invention relates to an ozone sterilizing system which sterilizes water in within a water dispensing system, such as bottled water dispenser or a point of use water dispenser.

BACKGROUND OF THE INVENTION

Bottled water dispensing systems and point of use water systems require means to sterilize the water within the system to ensure that the water therein does not harbor any bacteria or other contaminants. Such systems include a water source, which may be a point of use source which delivers water to a water reservoir, or an inverted bottle which is mounted such that the bottle mouth sits in a reservoir into which the water from the bottle may collect. Typically, a dispensing spout communicates with the reservoir which allows for water to be dispensed from said reservoir. Water within the reservoir is prone to the propagation of bacteria and germs given that often the reservoirs are not sealed and are contaminated by external sources, such as the outside of the water bottle. Known systems are not easy to be sterilized, thus the cleaning out process is frequently ignored and water contamination and virus reproduction inside water coolers may end up jeopardizing people's health.

One known solution is to provide ozone sterilizing systems within water coolers, wherein an ozone generator produces ozone and delivers it to water in the reservoir with ozone injection and diffusion means. The water in the reservoir is sterilized by the injected ozone. Generated ozone is then dissipated out of the water. Because generated ozone is potentially noxious and strict regulations control and often prohibit emission of ozone into air, known systems require that the ozone injection systems be operated for short periods of time followed by long periods of inactivity to allow excess ozone to dissolve such that it dissipates to a point that it becomes non-hazardous and falls under the maximum concentrations allowed by regulation with the lapse of time.

There is a need for an improved ozone sterilization system for use with water dispensing systems.

SUMMARY OF THE INVENTION

It is an object of the invention to provide an improved ozone sterilization system.

The herein invention provides an ozone sterilizing system which is able to sterilize water within a water reservoir of a water dispensing system, and which prevents emission of ozone outside of the reservoir, by having a closed reservoir including ozone filtering means therein or communicating therewith to capture and decompose generated ozone which is emitted through the water and prevent same from being released into the atmosphere.

In accordance with an aspect of the invention, the ozone generating system includes a water reservoir for accepting water from a water source, and from which water may be dispensed. An ozone generator produces ozone and such ozone is delivered to water within the reservoir through an ozone diffuser connected to the ozone generator and positioned within the water reservoir. The water reservoir is sealed closed to prevent release of generated ozone into the atmosphere. Filter means, such as an active carbon filter is provided which captures and neutralizes excess ozone within the reservoir. Preferably the ozone generator is mounted inside of the cooler, either above water level (preferred) or below water tank, inside of cooler cabinet.

In accordance with a further aspect of the invention there is provided an ozone sterilization system for sterilizing water comprising a water reservoir for accepting water from a water source, and from which water may be dispensed; an ozone generator for producing ozone, said ozone being delivered to water within the reservoir through an ozone diffuser connected to the ozone generator and positioned within the water reservoir; said water reservoir being sealed closed to prevent release of generated ozone into the atmosphere; and ozone filter means positioned within an upper portion of said reservoir or communicating with said upper portion, which captures and decomposes excess ozone within the reservoir. In accordance with an aspect of the invention, the filtration means is an active carbon filter. It should be understood that any known filtration means may be utilized.

In accordance with a further aspect of the invention, there is provided an ozone sterilizing system for use in a bottled water dispenser, said dispenser defining an internal reservoir including an opening formed in a top cover portion thereof for accepting a water supply bottle having a neck extending to a mouth, said bottle mountable by a bottle receptacle on the top cover of the reservoir in an inverted position such that the neck of the water bottle extends into the reservoir through said bottle receptacle and opening in the top cover portion of the reservoir, to supply water to the reservoir, said bottle, bottle receptacle and top of the reservoir forming a seal therebetween to prevent release of gas from said reservoir; said system further including an ozone generator, positioned outside the reservoir, and an ozone diffuser positioned inside the reservoir, connected to the ozone generator by a connector tube, said connector tube including one way valve means to allow ozone to flow from said generator to said diffuser, whereat said diffuser emits ozone into the water within the reservoir for sterilization thereof, said reservoir including an ozone filtering means for capturing excess ozone and neutralizing same. The ozone filtering means may be any known filtering means, but is preferably and active carbon filter.

Because excess ozone is captured by the ozone filter means, preferably activated carbon filter means, generation of ozone may be undertaken continuously without the need for generation of ozone for short intervals of time or the need to disconnecting anything and not blowing ozone out.

In accordance with a further aspect of the invention, the ozone diffuser is a small tubular shaped piece positioned within the water reservoir, preferably positioned centrally and adjacent the lower portion of the reservoir.

Other aspects and advantages of the invention, as well as the structure and operation of example embodiments of the invention, will become apparent to those ordinarily skilled in the art upon review of the following description of the invention in conjunction with the accompanying drawings.

DETAILED DESCRIPTION OF EXAMPLE EMBODIMENTS OF THE INVENTION

Shown in FIGS. 1, 3, 4, 5, 6 is an embodiment of the invention which includes a water bottle 1, a water reservoir cover 10, a water reservoir 2, which is preferably a cold water tank having either internal or external evaporators, an ozone sterilizing system with an ozone generator 3 positioned outside water reservoir 2 and an ozone diffuser 4 preferably at the bottom of the water reservoir 2, a soft connecting tube 6, a unilateral valve 15 on the tube, an active carbon filter, which is illustrated as an active carbon kettle is placed on the water reservoir cover 10 inside the reservoir 2. The water reservoir includes a water reservoir cover 10. The cover is mounted under a bottle receptacle 30 which supports the inverted water bottle. A piercing spike 40 is positioned in the center of the water reservoir cover. In the embodiments shown, there is a circular groove formed in the cover 10. In the embodiment of FIGS. 1, 2 to 6, this groove carries active carbon 5 therein to form an active carbon kettle, which as will be discussed below will absorb ozone and decompose same. If desired, an additional active carbon kettle can be mounted here as well. In the embodiment shown, there is active carbon 12 inside the kettle with a kettle lid 11. Between the active carbon kettle 5 and the kettle lid, there are two seal rings 13 in order to make ozone absorbed completely rather than being sent out from the upper surface of the kettle. In this embodiment there is a quarantine metal plank 14 in the kettle. As ozone passes through the water and into the air, ozone enters from the air inlet 9 at the bottom of the cold water reservoir cover 10 and vents out from the air outlet 11-1 on the kettle lid 11.

In order to prevent water from entering the air pump inside the ozone producer 3 because of water flowing backwards, there mounts a unilateral valve 15 on the soft connecting tube 6.

Figure 2:
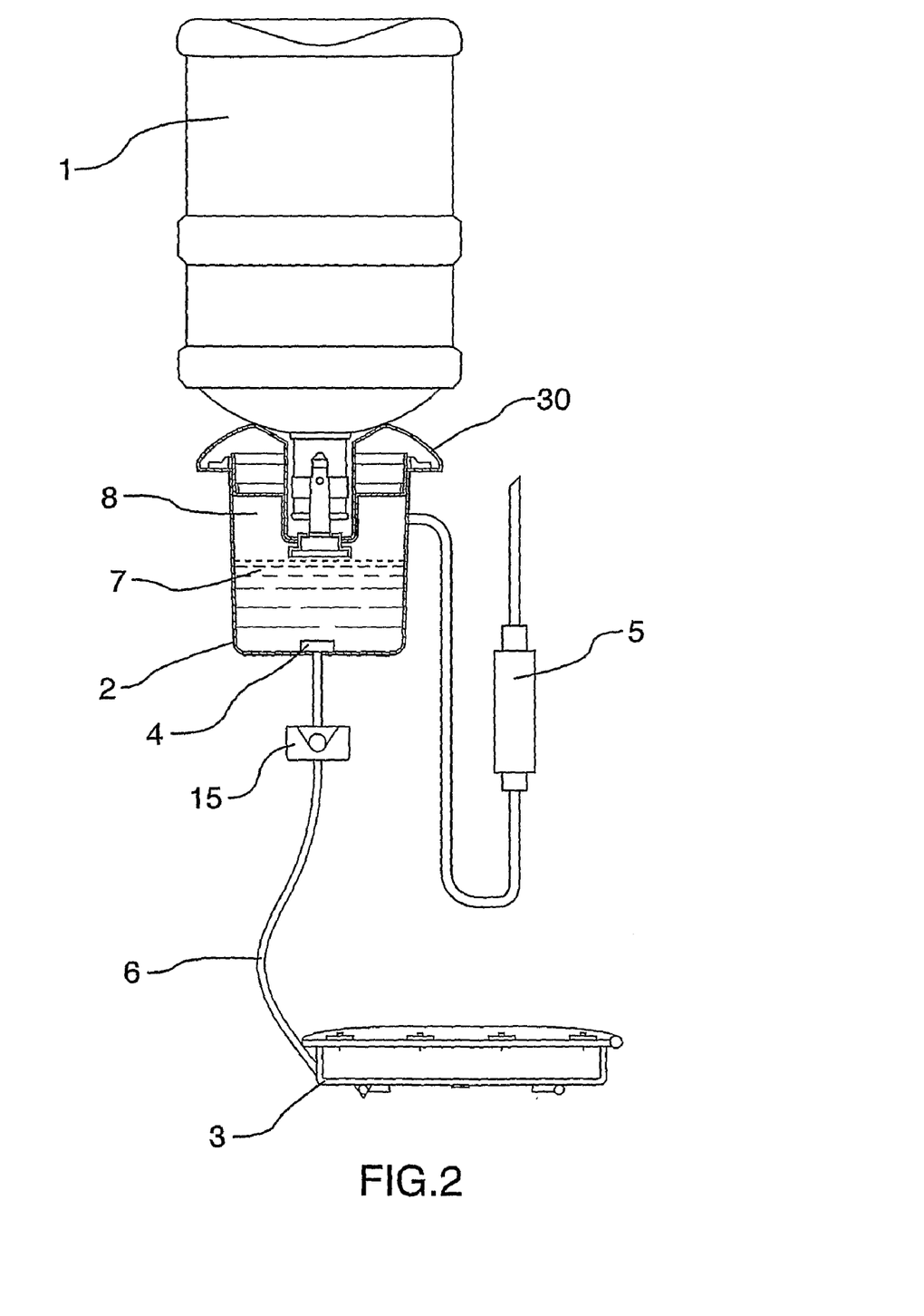
FIG. 2 is a second embodiment of an ozone sterilization system in accordance with an aspect of the invention, illustrating an external active carbon filter.
Figure 3:
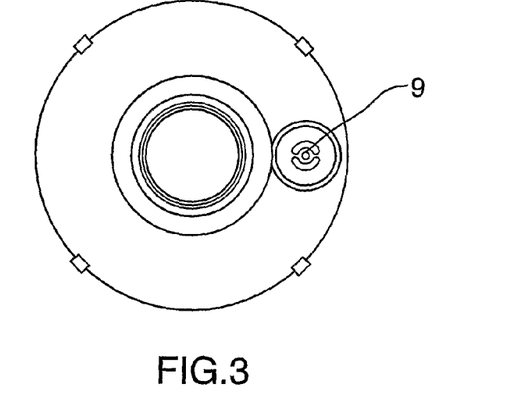
FIG. 3 is a bottom view of a water reservoir cover in accordance with the embodiment of FIG. 2.
Figure 4:
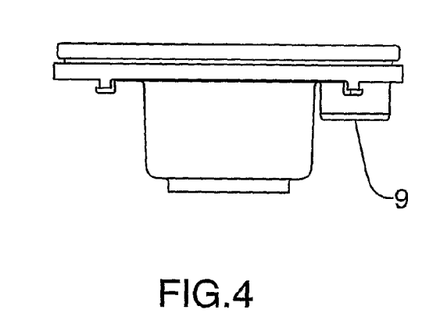
FIGS. 4 to 6 are respective side, top plan and sectional views of the reservoir cover of the embodiment of FIG. 3.
Figure 5:
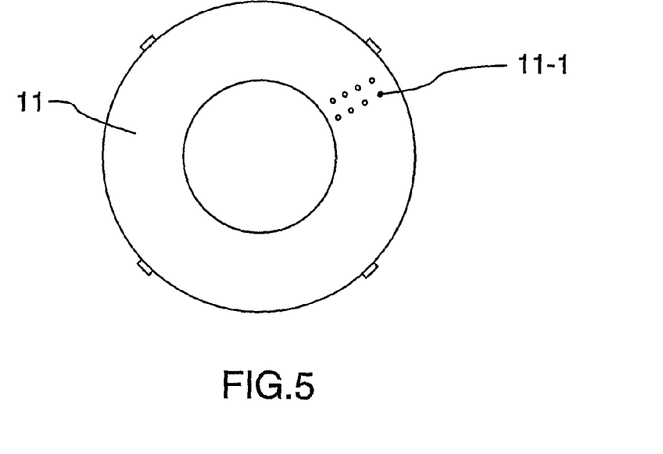
Figure 6:
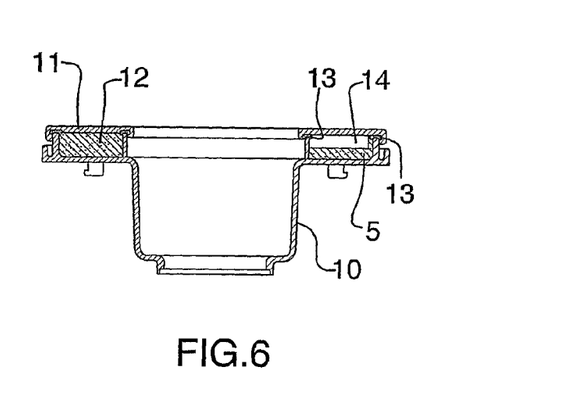

As indicated by FIG. 2, in the second embodiment the active carbon filter is a kettle 5 mounted externally. The kettle is of a long column shape. The active carbon kettle 5 is connected to the cold water reservoir by a soft connecting tube 6, one end of which enters the cold water reservoir through the side wall of the cold water reservoir; while the other protrudes out through the active carbon kettle. It should be emphasized that the end that enters the cold water reservoir must be higher than the water surface. In this applicable new model, the upper lid structure of the ozone filter is similar to a filtration bolt, on which there are dense holes.

In the embodiments shown, the ozone diffuser/emitter 4 is positioned adjacent the bottom of the water reservoir 2, centrally within the reservoir. The ozone diffuser is a small tubular shaped piece positioned within the water reservoir, preferably positioned centrally and adjacent the lower portion of the reservoir. Preferably it is comprised of porous metal, such as stainless steel, with 50 micron porosity. In a particular preferred embodiment, it is a tube cut into small short lengths.

Figure 1:
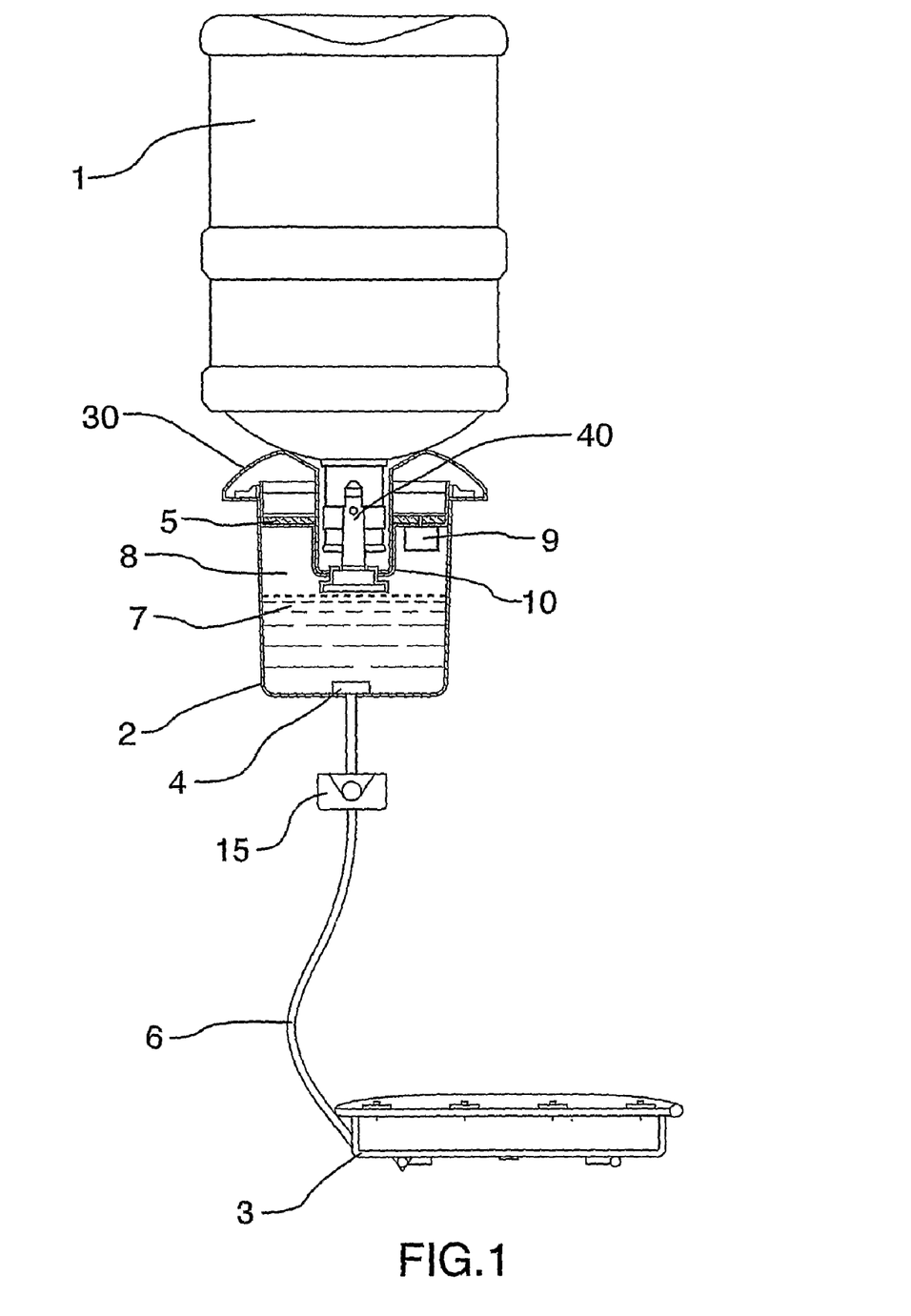
FIG. 1 is a first embodiment of an ozone sterilizing system in accordance with an aspect of the invention with an internal active carbon filter.
Figure 8:
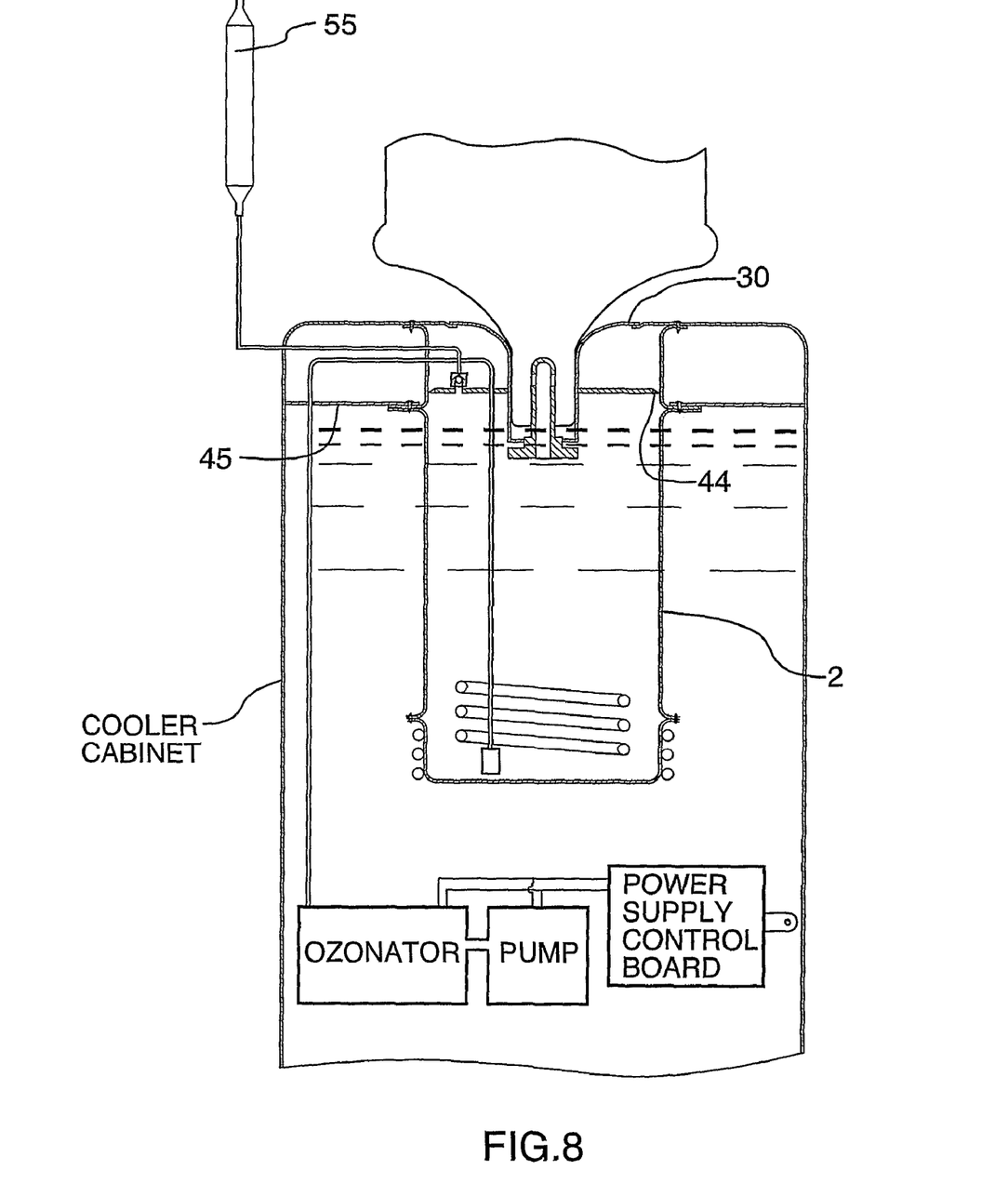
FIGS. 8 and 8a are schematic views of further embodiments of the invention utilizing external active carbon filters.
Figure 8A:
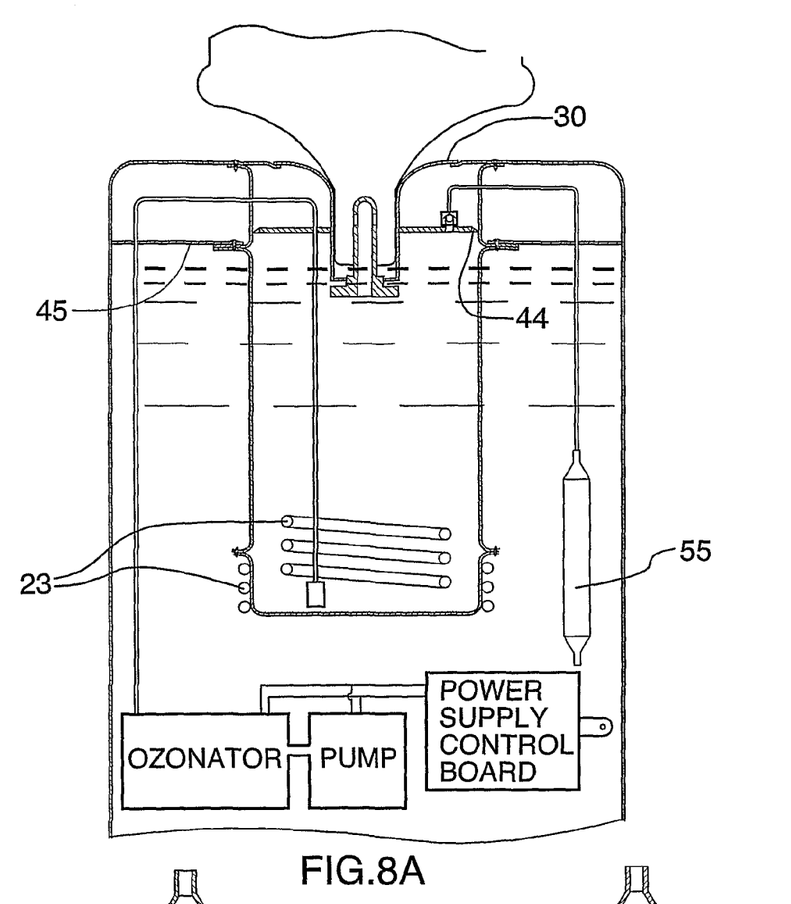

It should be understood that the ozone filtration means may be any suitable filter means to decompose ozone. For example, alternate activated carbon filters may be utilized with the herein invention, as opposed to the specific form of active carbon kettle shown in FIGS. 1, 3 to 6, 9 and 10. In the embodiment of FIG. 1 and FIGS. 8 and 8a, the active carbon filter, such as filter 55 shown in FIGS. 8 and 8a is mounted externally and is connected to the interior of the reservoir by a tube.

Figure 9:
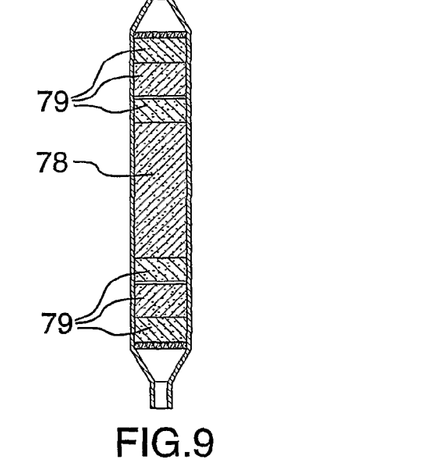
FIG. 9 is an illustration of an example embodiment of a carbon filter in accordance with the invention.
Figure 10:
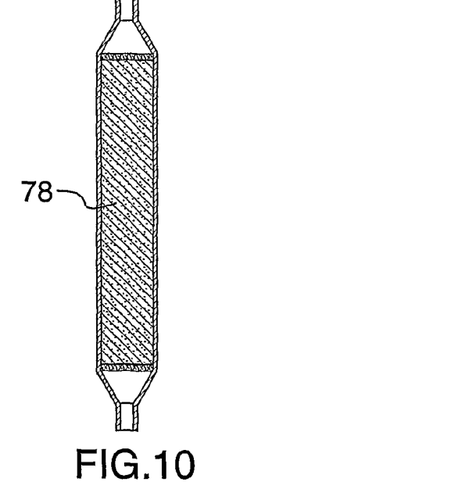
FIG. 10 is an illustration of another example embodiment of a carbon filter in accordance with the invention.
Figure 11:
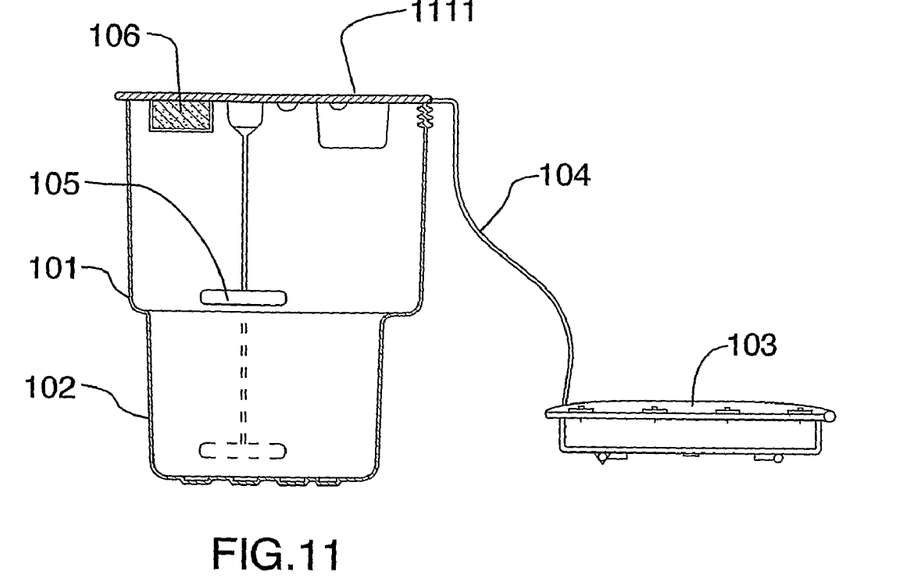
FIG. 11 is an illustration of an embodiment of an ozone sterilizing system to be used with a point of use water system.
Figure 12:
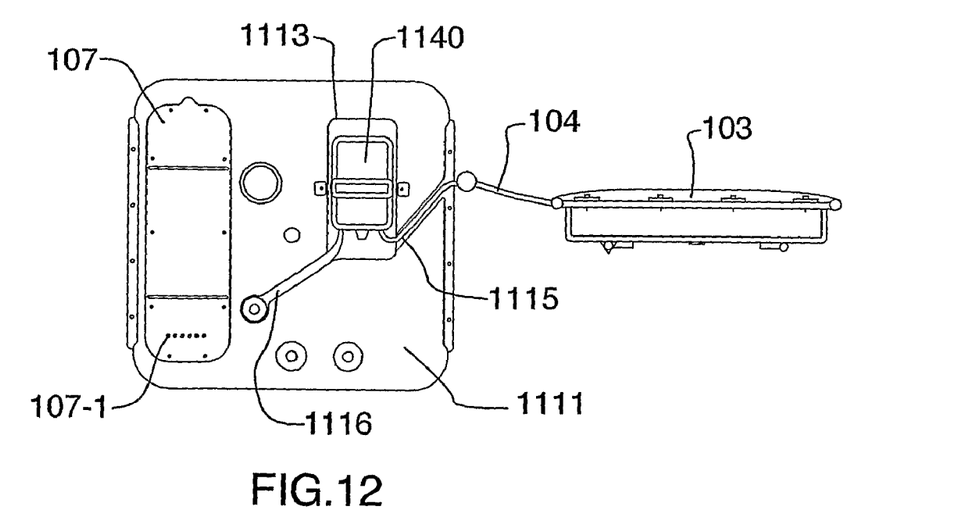
FIG. 12 is a bottom view of the reservoir cover of the embodiment of FIG. 11.

Shown in FIGS. 9 and 10 are example embodiments of active carbon filters which may be used with the herein invention. The carbon filter is formed with inlet means communicating with the reservoir which allows ozone to pass therein and an active carbon block portion 78 through which said ozone passes. As shown in FIG. 9, the carbon filter comprises an inlet for accepting ozone, a plurality of layers of foam 79 impregnated with activated carbon, positioned adjacent said inlet, and an active carbon block portion 78 adjacent said foam layers. Such filters are designed to prevent emission of ozone from the reservoir by decomposing said ozone.

Figure 7:
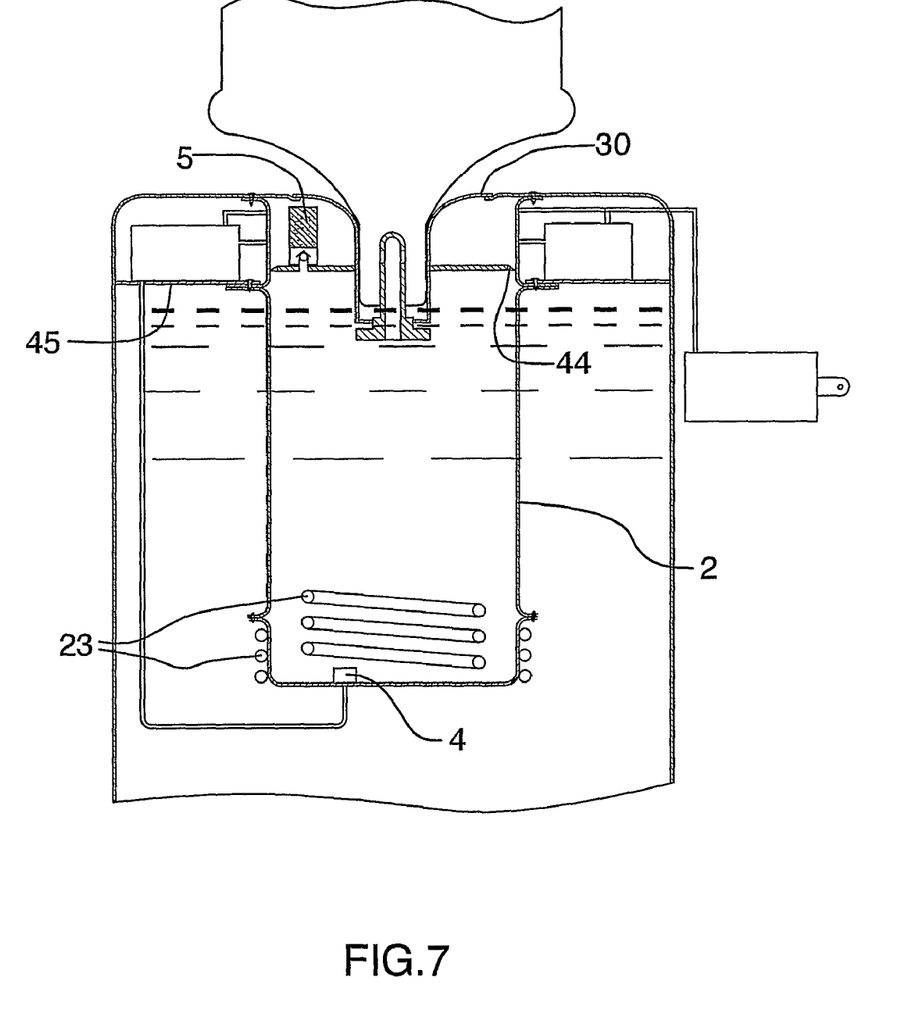
FIG. 7 is a schematic view of a further embodiment of the invention with an internally mounted active carbon filter in the top cover of the reservoir.

In the embodiments shown, it should be clear that the water reservoir cover, bottle and bottle receptacle are shaped and positioned so as to seal the reservoir closed when the water bottle is inverted into position into the reservoir. As can be seen in the embodiment of FIG. 7, sealing means 44 is provided between the reservoir cover 10 and the reservoir. In the embodiment of FIG. 7, the ozone generator is mounted within the water dispensing system, adjacent said water reservoir, positioned on a shelf 45, within the system cabinet. However, as shown in FIGS. 8 and 8a, the generator could be positioned elsewhere within the system.

Although features illustrated in FIGS. 11 to 19a may be similar to those shown in FIGS. 1 to 10, reference numbers used in the below FIGS. 11 to 19a are different that those of FIGS. 1 to 10. FIGS. 11 to 19a illustrate an ozone sterilization system for implementation with a point of use water system. As shown, example embodiments includes a water reservoir 101, into which water may be delivered from a point of use source, a water reservoir cover 1111, a cold water tank 102, in communication with the reservoir by openings therebetween, wherein water may be cooled by an evaporator 23 (either internal or external), and ultimately dispensed by dispensing means, such as a spout. Reed switches 66 positioned within the water reservoir are used to regulate the minimum and maximum water levels therein. The embodiment contains an ozone generator 103 positioned outside the water reservoir, a groove 1113 mounted inside the water tank cover 1111, and an air pump 1140 inside the groove. One end of the air pump, through the air inlet 1115, is connected to the ozone generator 103 by a soft connecting tube 104; the other end is connected to the interior connector 1120 through the air outlet 1116; the other end of the interior connector is mounted at the bottom of the water reservoir 101 or it is connected to the ozone diffusor 105, which is preferably positioned at or near the center and the bottom of the cold water tank 102. It should be understood that that the ozone emitter 5 can be mounted at the bottom of the water reservoir 101 or the cold water tank. Furthermore, the size and shape of the emitter may vary. If it is mounted at the bottom of cold water tank, the interior connector 1120 must be lengthened and goes into the cold water tank through the bottom of the water reservoir. In the embodiment of FIGS. 11, 12, 15 to 18 inside the water tank cover 1111, the active carbon filter, which is preferably active carbon kettle 106, whose main part is in the water reservoir 101 is positioned to contacting the air inside the water reservoir, and thus this carbon filter is consider to be interiorly mounted. In this embodiment, the active carbon kettle is of rectangle shape with a kettle lid. There is an air inlet 106-1 at the bottom of the kettle and an air outlet 107-1 on the kettle lid. The total cumulative area of air inlets openings 106-1 is bigger than that of air outlets 107-1, which facilitates the gas being absorbed by active carbon completely. There mounts a quarantine metal plank 109 and a seal ring 1110 between active carbon kettle 106 and the kettle lid 107. The quarantine metal plank urges the ozone go into the active carbon in order to be further disposed. It also prevents the ozone from venting into the air through the surface of active carbon. A seal ring effectively ensures that ozone never leaks out but is fully absorbed instead.

Figure 13:
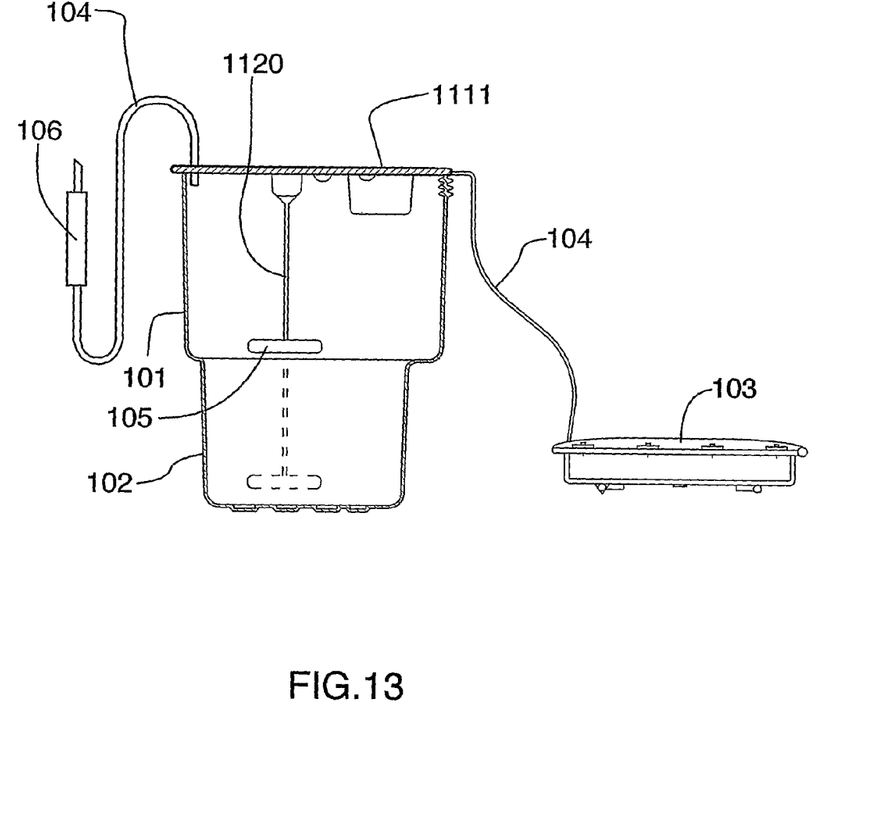
FIG. 13 an alternate embodiment of an ozone sterilizing system to be used with a point of use water system.
Figures 19, 19A:
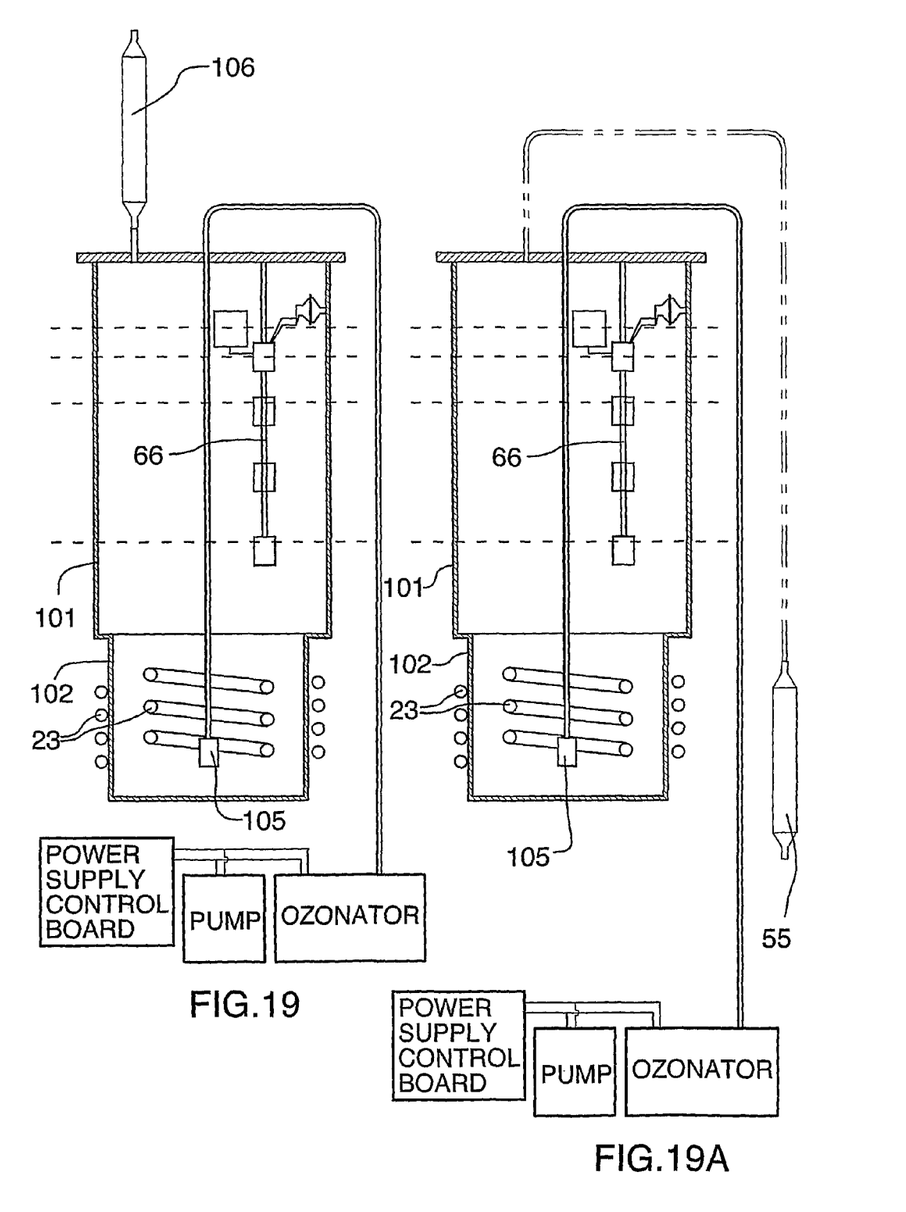
FIG. 19 is a schematic view of an alternate embodiment of the invention.
FIG. 19a is a schematic view of a further alternate embodiment of the invention.

As shown in FIGS. 13, 19 and 19a further embodiments have the active carbon filter 106 positioned outside reservoir; the filter 106 being of columned shape, which is connected to the water reservoir cover 1111 by a soft connecting tube 104 (as shown in FIG. 13) or any suitable tube means. One end of the tube enters the inner of water reservoir 101 through water reservoir cover, while the other protrudes outside through active carbon kettle 106. It should be understood that the carbon filter utilized may be as illustrated in FIG. 9 or 10 or otherwise. For example, the filter may be of a solid brick of active carbon or cut into a plurality of waffle like structures. The carbon filter of the embodiment of FIGS. 13 and 19 is positioned above the reservoir and in FIG. 19a it is positioned below the reservoir.

In another exteriorly mounted type carbon filter embodiment, the soft connecting tube 104 connected to active carbon kettle 106 enters the water reservoir 101 through the upper side wall of the water reservoir. In this embodiment, the part which enters the water reservoir must be higher than water surface of the water reservoir so that it doesn't affect the air circulation in the reservoir.

In an example embodiment of the invention, the upper lid structure of ozone emitter 105 is similar to a filtration bolt, on which there are dense apertures.

Figure 14:
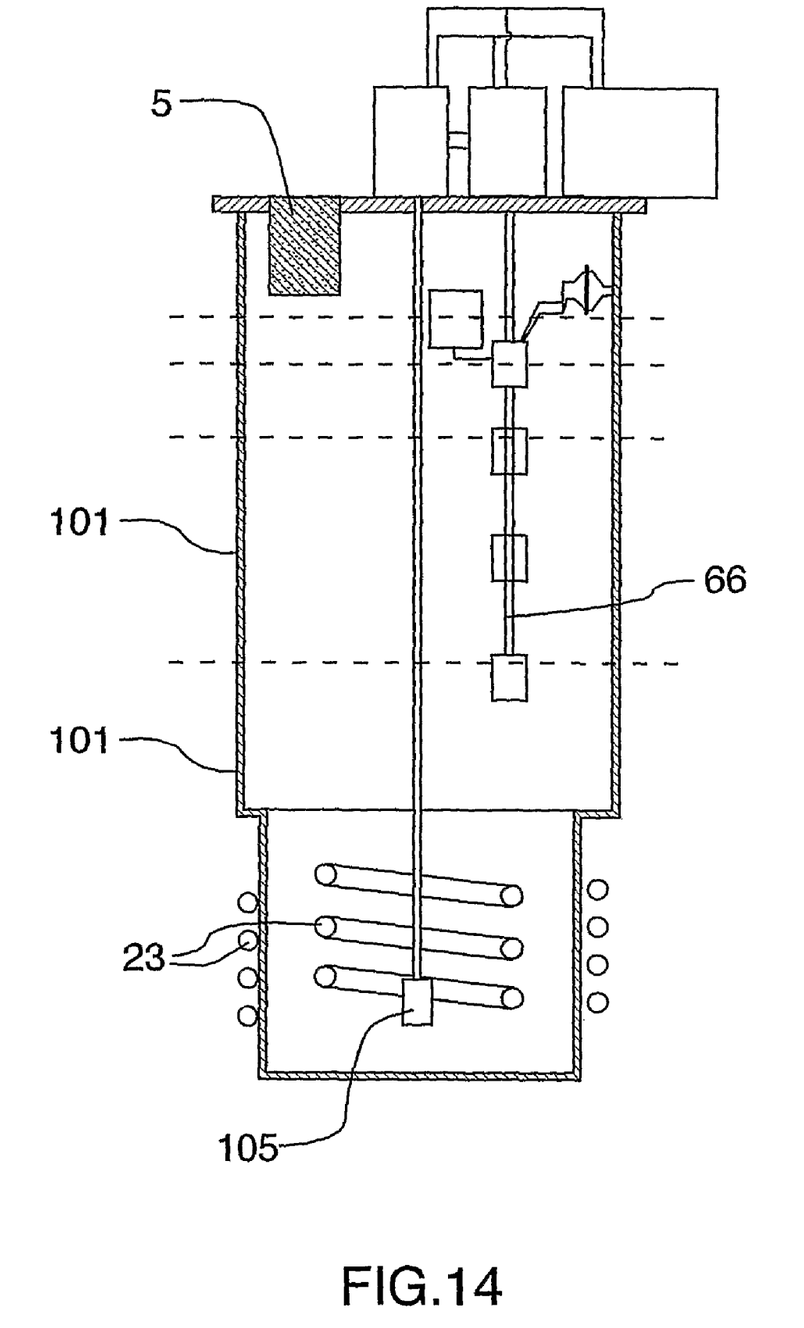
FIG. 14 is a schematic view of a further alternate embodiment of an ozone sterilization system with built in ozone filter.
Figure 15:
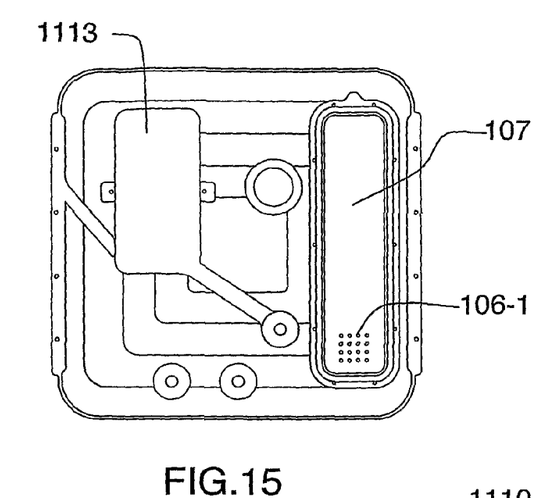
FIG. 15 is a top view of the water reservoir cover of the embodiment of FIG. 11.
Figure 16:
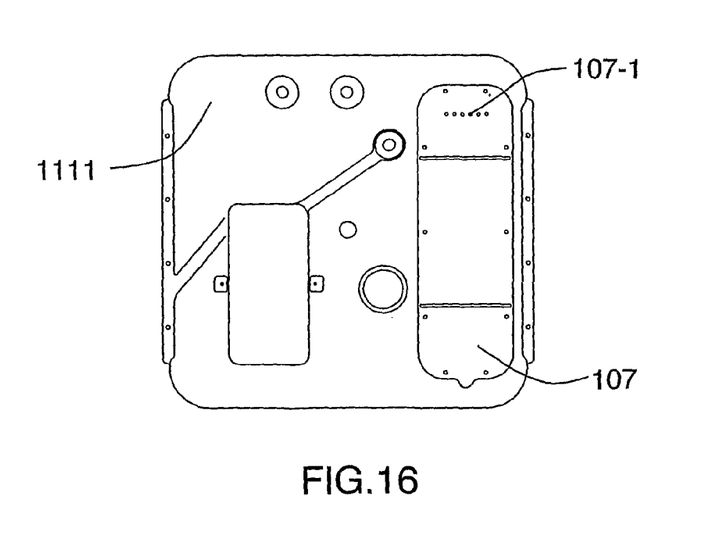
FIG. 16 is a bottom view of a water reservoir cover of the embodiment of FIG. 11.
Figure 17:
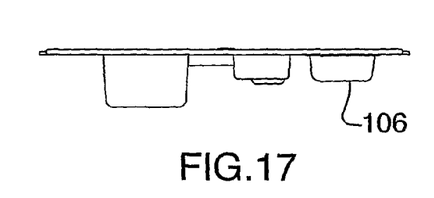
FIG. 17 is a side view of the water reservoir cover of the embodiment of FIG. 11.
Figure 18:
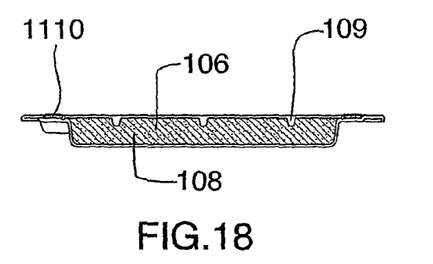
FIG. 18 is a section view of active carbon kettle used in the embodiment of FIG. 11.

As can be seen in FIG. 14, the ozone generator may be positioned upon a shelf on top of the water reservoir, although it may be positionable elsewhere, as is seen in FIGS. 19 and 19a.

The working principle and process of the invention herein is to apply ozone to kill virus in the water reservoir. Ozone is generated and emitted through water. Once emitted through the water, an amount of ozone enters the air, then it is caught out of the mixed gas by an active carbon filter which decomposes the ozone by itself afterwards. The active carbon filter, which is in one embodiment shown to be an active carbon kettle is big enough, i.e. the amount of active carbon in the kettle is enough to fully absorb the ozone in this system. In essence, the ozone generator produces ozone which enters the ozone emitter through the connecting tube, meanwhile, there are a lot of dense air bubbles contacting water and killing virus. The gas with ozone enters the active carbon kettle from one side and vents from the other side after being absorbed and discomposed such that the amount of ozone released from the reservoir into the surrounding environment is negligible.

The above-described embodiments of the present invention are intended to be examples only. Alterations, modifications and variations may be effected to the particular embodiments by those skilled in the art without departing from the scope of the invention, which is defined by the claims appended hereto.

The invention claimed is:

1. An ozone sterilizing system for use in a bottled water dispenser,
    said dispenser defining an internal reservoir including an opening formed in a top cover thereof for accepting a water supply bottle having a neck extending to a mouth,
    said bottle mountable by a bottle receptacle positioned on top of the top cover of the reservoir in an inverted position such that the neck of the water bottle extends into the reservoir through said bottle receptacle and opening in the top cover of the reservoir, to supply water to the reservoir,
    said bottle, bottle receptacle and top of the reservoir forming a seal therebetween to prevent release of gas from said reservoir;
    said system further including an ozone generator, positioned outside the reservoir, and an ozone diffuser positioned inside the reservoir, connected to the ozone generator by a connector tube, whereat said diffuser emits ozone into the water within the reservoir for sterilization thereof,
    said reservoir including an ozone filter for capturing excess ozone and decomposing same having a gas intake situated higher than the seal formed between the bottle and the bottle receptacle.

2. An ozone sterilization system as recited in claim 1, wherein said ozone filter is an active carbon filter.

3. An ozone sterilization system as recited in claim 2, wherein said active carbon filter is mounted to said top cover of said reservoir.

4. An ozone sterilization system as recited in claim 3, wherein said ozone diffuser is centrally located positioned adjacent the bottom of the water reservoir.

5. An ozone sterilization system as recited in claim 3, wherein said ozone generator is mounted adjacent said water reservoir upon a support shelf.

6. An ozone sterilization system as recited in claim 2, wherein said active carbon filter is mounted externally and is connected to the interior of the reservoir by a tube.

7. An ozone sterilization system as recited in claim 2, wherein said carbon filter comprises an ozone inlet communicating with the reservoir and an active carbon block portion into which said ozone is directed.

8. An ozone sterilization system as recited in claim 2, wherein said carbon filter comprises
- an inlet for accepting ozone,
- a plurality of layers of foam impregnated with activated carbon, positioned adjacent said inlet, and
- an active carbon block portion adjacent said foam layers.

9. An ozone sterilization system as recited in claim 2, wherein the top cover of the reservoir is sealingly engaged with the top of the reservoir, said top cover defining an opening therein through which the inverted bottle may be inserted to supply water to said reservoir in sealing engagement, said active carbon filter being mounted in said top cover.

* * * * *